United States Patent
Babb et al.

(10) Patent No.: US 10,160,830 B2
(45) Date of Patent: Dec. 25, 2018

(54) CONTINUOUS PROCESS FOR MAKING POLYETHER POLYOLS HAVING HIGH POLYMERIZED ETHYLENE OXIDE CONTENT USING A DOUBLE METAL CYANIDE CATALYST COMPLEX AND A MAGNESIUM, GROUP 3—GROUP 15 METAL OR LANTHANIDE SERIES METAL COMPOUND

(71) Applicant: Dow Global Technologies LLC, Midland, MI (US)

(72) Inventors: David A. Babb, Lake Jackson, TX (US); Jean-Paul Masy, Destelbergen (BE); Mattias Schaefer, Phillippine (NL); William A. Koonce, Pearland, TX (US); Donald Cameron, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/579,595

(22) PCT Filed: Jun. 15, 2016

(86) PCT No.: PCT/US2016/037526
§ 371 (c)(1),
(2) Date: Dec. 4, 2017

(87) PCT Pub. No.: WO2016/209677
PCT Pub. Date: Dec. 29, 2016

(65) Prior Publication Data
US 2018/0162995 A1    Jun. 14, 2018

Related U.S. Application Data

(60) Provisional application No. 62/182,462, filed on Jun. 20, 2015.

(51) Int. Cl.
*C08G 65/26* (2006.01)

(52) U.S. Cl.
CPC ....... *C08G 65/2609* (2013.01); *C08G 65/266* (2013.01); *C08G 65/2651* (2013.01); *C08G 65/2654* (2013.01); *C08G 65/2663* (2013.01); *C08G 65/2696* (2013.01); *C08G 2650/22* (2013.01); *C08G 2650/58* (2013.01)

(58) Field of Classification Search
CPC ............... C08G 65/10; C08G 65/2609; C08G 65/2663; C08G 65/266; C08G 2650/58
See application file for complete search history.

(56) References Cited

U.S. PATENT DOCUMENTS

| | | | |
|---|---|---|---|
| 4,792,620 A * | 12/1988 | Paulik | B01J 31/0231 560/232 |
| 6,884,826 B2 | 4/2005 | Le-Khac | |
| 2013/0143977 A1* | 6/2013 | Villa | C08G 18/3203 521/174 |
| 2013/0190462 A1 | 7/2013 | Wolf | |

FOREIGN PATENT DOCUMENTS

| | | | |
|---|---|---|---|
| WO | 2012/191968 A | 7/2012 | |
| WO | WO-2012091968 A1 * | 7/2012 | ......... C08G 65/2663 |
| WO | 2013/095976 A | 6/2013 | |
| WO | 2015/047583 A | 4/2015 | |

OTHER PUBLICATIONS

Norskov et al, Nature Chemistry, Towards the Computational Design of Solid Catalysts, 2009, 1, pp. 37-46. (Year: 2009).*
Herzberger et al, Chemical Reviews, Polymerization of Ethylene Oxide, Propylene Oxide, and Other Alkylene Oxides: Synthesis, Novel Polymer Architectures, and Bioconjugation, 2016, 116, pp. 2170-2243. (Year: 2016).*

* cited by examiner

*Primary Examiner* — Paul A Zucker

(57) ABSTRACT

An alkylene oxide mixture containing greater than 50% by weight ethylene oxide is continuously polymerized in the presence of a double metal cyanide polymerization catalyst and certain magnesium, Group 3-Group 15 metal or lanthanide series metal compounds. The presence of the magnesium, Group 3-Group 15 metal or lanthanide series metal compound permits the polymerization to be performed continuously without premature deactivation of the double metal cyanide catalyst.

10 Claims, No Drawings

CONTINUOUS PROCESS FOR MAKING POLYETHER POLYOLS HAVING HIGH POLYMERIZED ETHYLENE OXIDE CONTENT USING A DOUBLE METAL CYANIDE CATALYST COMPLEX AND A MAGNESIUM, GROUP 3—GROUP 15 METAL OR LANTHANIDE SERIES METAL COMPOUND

This invention relates to a process for continuously copolymerizing an alkylene oxide mixture containing predominantly ethylene oxide in the presence of a double metal cyanide (DMC) polymerization catalyst.

DMC complexes are effective catalysts for polymerizing propylene oxide to form poly(propylene oxide) polyols. The poly(propylene oxide) polyols are useful as a raw material for making polyurethanes.

Mixtures of propylene oxide and ethylene oxide have also been polymerized using DMC catalysts. In general, these mixtures have contained mostly propylene oxide and a minor amount of ethylene oxide. In some cases, DMC catalysts have been described for polymerizing mixtures containing predominantly ethylene oxide. However, these polymerizations have been mainly limited to end-capping a poly(propylene oxide) in an attempt to introduce primary hydroxyl groups. For example, U.S. Pat. No. 6,884,826 describes a process in which propylene oxide is polymerized using a DMC catalyst. As the polymerization proceeds, ethylene oxide is fed along with the propylene oxide, in gradually increasing proportions. During the last 15% or so of the polymerization, the ethylene oxide concentration in the monomer mixture being fed to the reaction increases above 50% by weight.

The process of U.S. Pat. No. 6,884,826 has significant shortcomings. It is inherently a batch or semi-batch process, and is not adaptable to continuous polyol production. Additionally, although the DMC catalyst remains active for the relatively short periods during which ethylene oxide is the predominant monomer present, it nonetheless deactivates after only a short time. This again restricts the process of U.S. Pat. No. 6,884,826 to batch or semi-batch operation.

A random copolymer of predominantly ethylene oxide and a minor amount of propylene oxide is useful in some polyurethane applications. These polyols have found use as, for example, for making viscoelastic foam. They are also useful as cell openers in flexible polyurethane foam. These polyols can be made in batch or semi-batch processes using potassium hydroxide or other basic catalysts, but no commercially acceptable method has been found for making these polyols using a DMC catalyst, because of the problem of catalyst deactivation in the presence of high concentrations of ethylene oxide in the monomer feed. Because of the potential advantages DMC catalysis offers, it would be desirable to provide a continuous process for making these random copolymers.

This invention is a continuous process for producing a polyether product by polymerizing an alkylene oxide mixture containing propylene oxide and greater than 50% by weight ethylene oxide, based on the weight of the alkylene oxide mixture, comprising:

a) forming in a continuous reactor a mixture of a double metal cyanide catalyst, the alkylene oxide mixture, at least one initiator compound, a Group 3-Group 15 metal or lanthanide series compound not present during the preparation of the double metal cyanide catalyst and a polymerizate consisting of alkoxylated species having molecular weights greater than the initiator compound and up to and including molecular weight of the polyether product, and b) continuously adding additional catalyst, additional Group 3-Group 15 metal or lanthanide series compound, additional alkylene oxide oxide mixture and additional initiator compound to the continuous reactor under polymerization conditions and continuously withdrawing a product stream containing the polyether product from the continuous reactor, wherein the magnesium, Group 3-Group 15 metal or lanthanide series compound includes a magnesium, Group 3-Group 15 metal or lanthanide series metal bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion, and the magnesium, Group 3-Group 15 or lanthanide series metal compound is devoid of halide anions.

Surprisingly, the presence of the magnesium, Group 3-Group 15 or lanthanide series metal compound reduces the tendency of the DMC catalyst to deactivate in the presence of a high ethylene oxide monomer mixture, allowing the polymerization to proceed to high molecular weights if desired and further permitting sustained continuous operation.

The alkylene oxide mixture polymerized in this invention contains greater than 50% by weight ethylene oxide, based on the weight of the oxide mixture. It may contain, for example, at least 51% or at least 60% by weight ethylene oxide, and may contain as much as 95%, at much as 90%, as much as 80% or at much as 75% ethylene oxide, by weight in each case. The alkylene oxide mixture contains less than 50% by weight 1,2-propylene oxide. It may contain up to 49%, up to 40%, up to 25%, up to 20%, up to 10% or up to 5% by weight 1,2-propylene oxide. The alkylene oxide mixture may contain a small amount, such as up to 25% by weight, up to 10% by weight or up to 5% by weight, of one or more other alkylene oxides, but such other alkylene oxides may be omitted.

The initiator compound is an organic compound that is to be alkoxylated in the polymerization reaction. It preferably contains 1 or more hydroxyl groups, preferably 2 or more hydroxyl groups. It may contain 12 or more hydroxyl groups. Preferred initiators contain 2 to 8 hydroxyl groups per molecule. In some embodiments, the initiator compound contains 2 to 4 or from 2 to 3 hydroxyl groups per molecule. The initiator compound may have at least two hydroxyl groups that are in the 1,2- or 1,3-positions with respect to each other (taking the carbon atom to which one of the hydroxyl groups is bonded as the "1" position). Mixtures of initiator compounds can be used.

The initiator compound has a hydroxyl equivalent weight less than that of the polyether product. It may have a hydroxyl equivalent weight of 30 to 500 or more. In some embodiments, the initiator compound has a hydroxyl equivalent weight of 30 to 125, especially 30 to 100.

Suitable initiators include but are not limited to ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol and sucrose, phenol and polyphenolic initiators such as bisphenol A or 1,1,1-tris(hydroxyphenyl)ethane and the like, as well as alkoxylates (especially ethoxylates and/or propoxylates) of any of these that have a molecular weight less than that of the product of the polymerization.

The initiator may be neutralized with or contain a small amount of an acid, particularly if the initiator is produced in the presence of a base (as is often the case when the initiator is glycerin). If an acid is present, it may be present in an amount of about 10 to 100 ppm, based on the weight of the initiator, as described in U.S. Pat. No. 6,077,978. Alternatively, the acid may be used in somewhat larger amounts, such as 100 to 1000 ppm, again based on the weight of the initiator, as described in US Published Patent Application No. 2005-0209438.

Suitable double metal cyanide (DMC) catalysts include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula

$$M_b[M^1(CN)_r(X)_t]_c[M^2(X)_6]_d \cdot nM^3_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. The foregoing formula does not reflect the presence of neutral complexing agents such as t-butanol which are often present in the DMC catalyst complex.

M and $M^3$ each are preferably a metal ion independently selected from the group consisting of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$, with $Zn^{2+}$ being preferred.

$M^1$ and $M^2$ are preferably $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state are more preferred as the $M^1$ and $M^2$ metal. $Co^{+3}$ and $Fe^{+3}$ are even more preferred and $Co^{+3}$ is most preferred.

Suitable anions A include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

r is preferably 4, 5 or 6, preferably 4 or 6, and most preferably 6; t is preferably 0 or 1, most preferably 0. In most cases, r+t will equal six.

A suitable type of DMC catalyst complex is a zinc hexacyanocobaltate catalyst complex as described, for example, in any of U.S. Pat. Nos. 3,278,457, 3,278,458, 3,278,459, 3,404,109, 3,427,256, 3,427,334, 3,427,335 and 5,470,813. An especially preferred type of DMC catalyst is complexed with t-butanol.

The concentration of DMC catalyst complex in the process may be 1 to 5000 ppm based on the weight of the polyether product. The concentration of DMC catalyst complex may be at least 2 ppm, at least 5 ppm, at least 10 ppm, at least 25 ppm, or up to 200 ppm or up to 100 ppm, based on the weight of the polyether product.

The Group 3-Group 15 or lanthanide series metal compound ("MG3-15LA compound") is a separately added ingredient, which is not present during the preparation of the DMC catalyst. The preparation of the DMC catalyst includes a precipitation step in which starting compounds are mixed in solution and the DMC catalyst forms and precipitates. The MG3-15LA compound is not present during this catalyst-forming step and preferably is not present during any subsequent step or steps in which the DMC catalyst is complexed with one or more complexing agents.

The MG3-15LA compound contains a magnesium, Group 3-Group 15 metal or lanthanide series metal ion bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion. The MG3-15LA compound is devoid of halide anions. The MG3-15LA compound is preferably devoid of sulfate, sulfite, persulfate, nitrate, nitrite, chlorate, perchlorate, hypochlorite, carbonate, chromate, silicate, hexafluorosilicate, borate, tetrafluoroborate, nitrate, ortho-arsenate, selenate, aurate, tetrachloroaurate, palatinate, tetrachloroplatinate hexafluorophosphate sulfonate (such as trifluoromethylsulfonate and methyl sulfonate) and hydroxide ions. For purposes of this invention, the MG3-15LA compound is considered to be "devoid" of a material if it contains less than 0.25% by weight thereof. The MG3-15LA compound preferably contains no more than 0.1% by weight thereof.

The Group 3-Group 15 metal is one falling within any of groups 3 through 15, inclusive, of the 2010 IUPAC periodic table of the elements. The metal may be, for example, scandium, yttrium, lanthanum, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, aluminum, gallium, indium, tellurium, germanium, tin, lead, antimony, bismuth, and the lanthanide series metals including those having atomic numbers from 58 (cerium) to 71 (lutetium), inclusive.

Preferred metals include those in Groups 3, 4, 5, 12, 13 and 14. Among these, scandium, yttrium, hafnium, titanium, zirconium, niobium, vanadium, zinc, aluminum, gallium, indium and tin are more preferred, as these metals tend to provide fast polymerization rates and/or allow very small quantities of the DMC catalyst to be present. Aluminum, zinc, hafnium, gallium, indium, tin, titanium and zirconium are especially preferred.

The "alkoxide ion" is a species having the form $^-$O—R, where R is an alkyl group or substituted alkyl group. The alkoxide ion is the conjugate base, after removal of a hydroxyl hydrogen, of an alcohol compound having the form HO—R. These alcohols typically have pKa values in the range of 13 to 25 or greater. The alkoxide ion in some embodiments may contain from one to 20, preferably from one to 6 and more preferably from 2 to 6 carbon atoms. The alkyl group or substituted alkyl group may be linear, branched and/or cyclic. Examples of suitable substituents include, for example, additional hydroxyl groups (which may be in the alkoxide form), ether groups, carbonyl groups, ester groups, urethane groups, carbonate groups, silyl groups, aromatic groups such as phenyl and alkyl-substituted phenyl, halogen, and the like. Examples of such alkoxide ions include methoxide, ethoxide, isopropoxide, n-propoxide, n-butoxide, sec-butoxide, t-butoxide, benzyloxy, and the like. In other embodiments, the R group may contain one or more hydroxyl groups and/or may contain one or more ether linkages. An alkoxide ion may correspond to the residue (after removal of one or more hydroxyl hydrogens) of an initiator compound that is present in the polymerization, such as those initiator compounds described below. The alkoxide ion may be an alkoxide formed by removing one or more hydroxyl hydrogens from a polyether monol or polyether polyol; such an alkoxide in some embodiments corresponds to a residue, after removal of one or more hydroxyl hydrogen atoms, of the polyether monol or polyether polyol product that is obtained from the alkoxylation reaction, or of a polyether having a molecular weight intermediate to that of the initiator compound and the product of the alkoxylation reaction.

The "aryloxy anion" is species having the form $^-$O—Ar, where Ar is an aromatic group or substituted group, and which corresponds, after removal of a hydroxyl hydrogen, to a phenolic compound having the form HO—Ar. These phenolic compounds may have a pKa of, for example, from about 9 to about 12 at 25° C. Examples of such aryloxy anions include phenoxide and ring-substituted phenoxide compounds, wherein the ring-substituent(s) include, for example, one or more of alkyl, $CF_3$, cyano, $COCH_3$, halogen, hydroxyl, alkoxyl and the like. The ring-substituent(s), if present, may be in one or more of the ortho-, para- and/or meta-positions relative to the position of the phenolic oxygen. The phenoxide anions also include the conjugate bases of polyphenolic compounds such as bisphenol A, bisphenol F and various other bisphenols, 1,1,1-tris(hydroxyphenyl) ethane, and fused ring aromatics such as 1-naphthol and the like.

The carboxylate anion preferably contains one to 24, more preferably 2 to 18 and still more preferably 2 to 12 carbon atoms. It may be aliphatic or aromatic. An aliphatic carboxylic acid may contain one or more substituent groups such as hydroxyl groups (which may be in the alkoxide form), ether groups, carbonyl groups, ester groups, urethane groups, carbonate groups, silyl groups, aromatic groups such as phenyl and alkyl-substituted phenyl, halogen, and the like. Examples of aliphatic carboxylate anions include formate, acetate, propionate, butyrate, 2-ethylhexanoate, n-octoate, decanoate, laurate and other alkanoates and halogen-substituted alkanoates such as 2,2,2-trifluoroacetate, 2-fluoroacetate, 2,2-difluoroacetate, 2-chloroacetate, 2,2,2-trichloroacetate and the like. Aromatic carboxylates include benzoate, alkyl-substituted benzoate, halo-substituted benzoate, 4-cyanobenzoate, 4-trifluoromethylbenzoate, salicylate, 3,5-di-t-butylsalicylate, subsalicylate, and the like. In some embodiments, such a carboxylate ion may be the conjugate base of a carboxylic acid having a pKa from 1 to 6, preferably from 3 to 5 at 25° C.

The "acyl anion" is a conjugate base of a compound containing a carbonyl group including, for example, an aldehyde, ketone, carbonate, ester or similar compound that has an enol form. Among these are conjugate bases of ß-diketo compounds such as acetoacetonate, butylacetoacetonate and the like.

Phosphate ester anions include those having the formula $^-$O—P(O)(OR$^1$)$_2$, wherein R is alkyl, substituted alkyl, phenyl or substituted phenyl. Thiophosphate esters have the corresponding structure in which one or more of the oxygens are replaced with sulfur.

An "amide anion" is an ion in which a nitrogen atom bears a negative charge. The amide ion generally takes the form $^-$N(R$^2$)$_2$, wherein the R$^2$ groups are independently hydrogen, alkyl, aryl, trialkylsilyl, triarylsilyl and the like. The alkyl groups may be linear, branched or cyclic. Any of these groups may contain substituents such as ether or hydroxyl. The two R$^2$ groups may together form a ring structure, which ring structure may be unsaturated and/or contain one or more heteroatoms (in addition to the amide nitrogen) in the ring.

Hydrocarbyl anions include aliphatic, cycloaliphatic and/or aromatic anions wherein the negative charge resides on a carbon atom. The hydrocarbyl anions are conjugate bases of hydrocarbons that typically have pKa values in excess of 30. The hydrocarbyl anions may also contain inert substituents. Of the aromatic hydrocarbyl anions, phenyl groups and substituted phenyl groups are preferred. Aliphatic hydrocarbyl anions are preferably alkyl groups, which more preferably contain from 1 to 12, more preferably from 2 to 8 carbon atoms. Methyl, ethyl, n-propyl, isopropyl, n-butyl, sec-butyl, isobutyl, cyclopentadienyl and t-butyl anions are all useful, for example.

Among the suitable MG3-15LA compounds are those corresponding to either of the formula $M^4A^1_z$ and $M^4(O)A^1_z$, wherein $M^4$ is the magnesium, Group 3-Group 15 or lanthanide series metal and each $A^1$ is independently an anion as described before and z is a number of at least one which reflects an electrostatically neutral compound, provided that any two or more $A^1$ groups may together form a polyvalent group. Each $A^1$ preferably is independently an alkoxide, aryloxy anion, amide anion or hydrocarbyl anion that is the conjugate base of a compound having a pKa of at least 9, more preferably at least 12 and still more preferably at least 13. As before, any $A^1$ may be an alkoxide anion which is the conjugate base of an initiator compound or a polyether monol or polyether polyol, including the polyether monol or polyether polyol product that is obtained from the alkoxylation reaction or a polyether having a molecular weight intermediate to that of the initiator compound and the product of the alkoxylation reaction.

Suitable MG3-15LA compounds include alkyls of one or more of Mg, Hf, Ti, Zr, Zn, Al, Ga and In, in which the alkyl anions may be, for example, ethyl, propyl, butyl, ethylbutyl, benzyl and the like.

Other suitable MG3-15LA compounds include alkoxides of one or more of Mg, Sc, Y, Hf, Ti, Zr, V, Zn, Al, Ga, In and Sc. The alkoxide group may be, for example, one or more of methoxide, ethoxide, isopropoxide, t-butoxide, sec-butoxide, a polyether alcohol or polyether polyol, and the like.

Other suitable MG3-15LA compounds include aryloxides of one or more of Mg. Sc, Y, Hf, Ti, Zr, V, Zn, Al, Ga, In and Sc. The aryloxide group may be, for example, a phenoxide or a substituted phenoxide in which the phenoxide group is ring-substituted with one or more of alkyl, $CF_3$, cyano, $COCH_3$, halogen, hydroxyl or alkoxyl.

Other suitable MG3-15LA compounds include carboxylates of one or more of Mg, Sc, Y, Hf, Ti, Zr, V, Zn, Al, Ga, In and Sn. The carboxylate group may be, for example, formate, acetate propionate, 2-ethylhexanoate, benzoate, or a substituted benzoate in which the benzoate group is ring-substituted with one or more of alkyl, $CF_3$, cyano, $COCH_3$, halogen, hydroxyl and alkoxyl.

Other suitable MG3-15LA compounds include amides of one or more of Mg, Y, Hf, Ti, Zr, An, Al and Ga, in which the amide group(s) may be, for example, one or more of a dialkyl amide such as dimethylamide and diethylamide, diphenylamine, bis(trimethylsilyl)amide, and the like.

Other suitable MG3-15LA compounds include acetylacetonates and t-butylacetylacetonates of one or more of Mg, Sc, Y, Hf, Ti, Zr, V, Zn, Ga, Al, In and Sn.

Other suitable MG3-15LA compounds include alkylaluminum alkoxides and alkylgallium alkoxides such as diethylaluminum ethoxide, dimethylaluminum ethoxide, diethylaluminum isopropoxide, dimethylaluminum isopropoxide, diethylgallium ethoxide, dimethylgallium ethoxide, diethylgallium isopropoxide and dimethylgallium isopropoxide.

Other suitable MG3-15LA compounds include methyl aluminoxane and tetraethyldialuminoxane.

Still other suitable MG3-15LA compounds include stannous phosphate and stannous pyrophosphate.

In addition to the foregoing, other suitable MG3-15LA compounds include magnesium, Group 3-Group 15 or lanthanide series metal alkoxides wherein one or more of the alkoxide group(s) are the conjugate base, after removal of one or more hydroxyl hydrogen atoms, from (1) an initiator compound as described above, including the initiator compound present in the polymerization reaction, (2) a polyether monol or polyether polyol product of the polymerization reaction or (3) a polyether having a molecular weight intermediate to the initiator and the polyether monol or polyether polyol product of the polymerization.

If desired, mixtures of two or more of the foregoing MG3-15LA compounds may be used.

In the present invention, the mixture of ethylene oxide and 1,2-propylene oxide is polymerized in the presence of the DMC catalyst complex and the MG3-15LA compound. In some embodiments, enough of the MG3-15LA compound is present to provide at least 0.0005 moles of the magnesium, group 3-group 15 metal or lanthanide series metal per gram of the DMC catalyst complex. A preferred amount is enough to provide at least 0.0025 or at least 0.005 mole of the magnesium, group 3-group 15 metal or lanthanide series metal per gram of the DMC catalyst complex. It is generally not necessary to provide more than 10 moles of magnesium, group 3-group 15 metal or lanthanide series metal compound per gram of the DMC catalyst complex. A preferred upper limit is enough to provide up to 1 mole, up to 0.5 mole or up to 0.25 mole of magnesium, group 3-group 15 metal or lanthanide series metal per gram of DMC catalyst complex. The foregoing amounts do not include any amounts of metals that are included within the DMC catalyst complex.

The DMC catalyst complex and the MG3-15LA compound can be introduced, both during the start-up phase of the reaction until steady-state conditions are achieved and then during steady-state conditions, individually or as a catalyst mixture.

If the DMC catalyst complex and the MG3-15LA compound are introduced as a catalyst mixture, such a catalyst mixture preferably also contains at least one compound having one or more hydroxyl groups. The compound having one or more hydroxyl groups in some embodiments includes an initiator compound as described herein. Such an initiator compound is preferably the same initiator as is present during the polymerization reaction. The compound having one or more hydroxyl groups in some embodiments is a polyether monol or polyether polyol corresponding to the product of the polymerization. In some embodiments, the compound having one or more hydroxyl groups is a polyether of intermediate molecular weight between that of the initiator present in the polymerization and the product of the reaction. In yet other embodiments, the compound having one or more hydroxyl groups a mixture of two or more of the foregoing. In cases where the catalyst mixture does not contain an initiator, it is necessary to add an initiator compound to the reaction mixture, in addition to the compound having one or more hydroxyl groups. The compound having one or more hydroxyl groups (and any added initiator compound) may be neutralized with or contain a small amount (such as from 10 to 1000 ppm) of an acid, as described in U.S. Pat. No. 6,077,978 and US Published Patent Application No. 2005-0209438.

A catalyst mixture as described before may be heated to a temperature of 80 to 220° C., preferably 120 to 180° C. at atmospheric or subatmospheric pressure (the residual being nitrogen or other inert atmosphere) for a period of 10 minutes or more prior to performing the polymerization. This preliminary heating step is preferably performed in the presence of a compound having one or more hydroxyl groups (as described in the previous paragraph) and in the absence of an alkylene oxide. This preliminary heating step may cause an alcoholate of the magnesium, group 3-group 15 metal or lanthanide series metal and the initiator compound and/or polyether monol or polyol, as the case may be, to form in situ. This reaction is believed to generate the conjugate acid of some or all of the anion(s) originally present on the starting MG3-15LA compound. Such a conjugate acid preferably is more volatile than the initiator compound or polyether monol or polyether polyol and in such a case is believed to become volatilized under the conditions of the heating step to form a gas which is removed from the mixture during or after the preliminary heating step. The preliminary heating step is particularly preferred when the MG3-15LA compound includes amide anions. A catalyst mixture of DMC catalyst, MG3-15LA compound and initiator that is added during steady-state conditions may also be subjected to such a preliminary heating step prior to introducing such a mixture into the reactor.

The polymerization is performed continuously. Such a continuous process includes a start-up step a) in which the catalyst is first activated and initial concentrations of materials are established in the reactor. Preferably, step a) further includes establishing steady-state flows into and out of the reactor. More preferably, steady-state polymerization conditions are established during step a). The steady-state conditions include, for example, flow rates of materials into and out of the reactor, temperature and pressure, concentrations of initiator, alkylene oxide mixture, catalyst, MG3-15LA compound and polymerizate, all of which are constant to within the capability of the equipment. "Polymerizate" refers to polyethers formed in the alkoxylation of the initiator compound, including all polyethers those having molecular weights greater than the initiator compound and up to and including that of the product.

The catalyst, MG3-15LA compound, alkylene oxide mixture and initiator are fed continuously to the continuous reactor under polymerization conditions. The catalyst, MG3-15LA compound and initiator can be fed separately, or a mixture of any two or more thereof. A mixture of the catalyst, MG3-15LA compound and initiator may be subjected to a preliminary heating step as described before and then fed continuously to the reactor. A product stream is removed continuously from the continuous reactor. The feed rates of the feed(s) and withdrawal rates of the product stream are selected together to maintain steady-state conditions in the reactor (within the capabilities of the equipment), and to produce a product having a desired molecular weight.

The alkylene oxides may be fed to the reactor on demand by continuously pressurizing the reactor with the alkylene oxide mixture to a predetermined internal reactor pressure. Upon establishing steady-state operation, the concentration of unreacted alkylene oxide preferably is maintained at a level of from 0.01% to 10%, more preferably from 0.1% to 5% by weight, most preferably from 1 to 3% by weight, based on the weight of the reactor contents.

The polymerization temperature is typically at least 80° C., preferably at least 120° C., and more preferably at least 140° C. The reaction temperature may be 200° C. or higher, but it is preferred that the temperature does not exceed 190° C., more preferably 180° C., to maintain workable reactor pressures, avoid forming a significant amount of volatile impurities or other by-products, and maintain adequate catalyst activity without deactivating or decomposing the DMC catalyst. The polymerization reaction usually is performed at superatmospheric pressures, but can be performed at atmospheric pressure or even subatmospheric pressures.

The polymerization reaction can be performed in any type of vessel that is suitable for the pressures and temperatures encountered. The vessel should have one or more inlets through which the various feeds can be introduced during the reaction and at least one outlet through which a product stream can be withdrawn. A tubular reactor that has multiple points for injecting the starting materials, a loop reactor, and a continuous stirred tank reactor (CTSR) are all suitable types of vessels for continuous or semi-continuous operations. The reactor should be equipped with means of providing or removing heat, so the temperature of the reaction mixture can be maintained within the required range. Suitable means include various types of jacketing for thermal fluids, various types of internal or external heaters, and the like. A cook-down step performed on continuously withdrawn product is conveniently conducted in a reactor that prevents significant back-mixing from occurring. Plug flow operation in a pipe or tubular reactor is a preferred manner of performing such a cook-down step.

The product polyether may contain up to 0.5% by weight, based on the total weight, of unreacted alkylene oxide; small quantities of the initiator compound and alkoxylates thereof that have molecular weights lower than the product; and small quantities of other organic impurities and water. Volatile impurities should be flashed or stripped from the polyether. The product typically contains catalyst residues and residues of the MG-15LA compound. It is typical to leave these residues in the product, but these can be removed if desired. Moisture and volatiles can be removed by stripping the polyol.

The process of the invention is useful for preparing polyether products that can have hydroxyl equivalent weights from as low as about 85 to as high as about 5,000 or more. The hydroxyl equivalent weight may be, for example, 200 to 3000, 300 to 2000, 300 to 1500, 300 to 1000, or 300 to 500. In general, the equivalent weight will be determined according to the requirements of the anticipated use of the polyether. All equivalent and molecular weights mentioned herein are number average weights unless otherwise indicated.

The polymerization reaction can be characterized by the "build ratio", which is defined as the ratio of the number average molecular weight of the polyether product to that of the initiator compound. This build ratio may be as high as 160, but is more commonly in the range of from 2.5 to about 65 and still more commonly in the range of from 2.5 to about 50. The build ratio in some embodiments in the range of about 2.5 to about 15, or about 7 to about 11.

Polyethers made in accordance with this invention are useful as starting materials for making polyurethanes. Because they contain a large proportion of polymerized ethylene oxide, the polyethers are often somewhat hydrophilic and have high proportions of primary hydroxyl groups. They polyethers are particularly useful as starting materials for making viscoelastic polyurethane foam, and as cell openers for making slabstock and molded flexible conventional and/or high resiliency polyurethane foam. They are also useful as surfactants, and in water-absorbent applications such as sponges, diapers and incontinence products and the like.

The following examples are provided to illustrate the invention but are not intended to limit the scope thereof. All parts and percentages are by weight unless otherwise indicated. All molecular weights are number average by gel permeation chromatography unless otherwise indicated.

Comparative Run A

A continuous polymerization is performed in a 500 mL Autoclave Engineers continuous stirred tank reactor equipped with a heated external recirculation loop and an internal cooling coil. The recirculation loop is driven by a gear pump for recirculating the reactor contents. The reactor is further equipped with a near-infrared analyzer flow cell and injection ports for initiator, catalyst slurry and alkylene oxides.

The reactor has an exit port to allow the reactor contents to flow out of the reactor through a heated exit line into a sample collection system. The reactor pressure is controlled by a pressure control valve on the exit line.

A zinc hexacyanocobaltate catalyst complex is mixed with a 450 molecular weight poly(propylene oxide) triol to form a catalyst slurry containing 1% by weight of the catalyst complex.

The reactor is charged with 205 g of a 450 molecular weight, glycerin-initiated poly(propylene oxide) triol that contains 335 ppm of DMC catalyst and is acidified with 25 ppm of phosphoric acid. The mixture is heated to 130° C. for 90 minutes with a nitrogen sparge and continuous stirring to dry the reactor contents. The reactor is then heated to 160° C., the sparge is stopped, and the reactor is sealed. 141 g of 1,2-propylene oxide (PO) and 275 g of ethylene oxide (EO) are fed to the reaction mixture to activate the catalyst and alkoxylate the starting triol to a molecular weight of about 1000. Once the catalyst has activated, the feeds of ethylene oxide, propylene oxide, the DMC catalyst slurry and glycerin acidified with 75 ppm of phosphoric acid are started. The ethylene oxide/propylene oxide weight ratio is 66/34 by weight. Once the reactor reaches its liquid fill point, a product stream is withdrawn. The flow rates in and out of the reactor are adjusted to create a steady state concentration of DMC catalyst of 150 ppm and a residence time of 12 hours.

The concentration of unreacted alkylene oxides in the reactor is monitored as an indicator of catalyst activity. At the beginning of the glycerin feed, the concentration of unreacted oxides is about 2% as measured in real time by the near infrared analyzer. Thereafter, the concentration of unreacted oxides rises continuously over 10 hours to 6% due to the deactivation of the catalyst. The reactor automatically shuts down when the concentration of unreacted oxides reaches 6%, as a safety precaution. The 10 hours of operation corresponds to less than one reactor volume of product being formed. The final reactor product contains 142 ppm of the DMC catalyst.

EXAMPLE 1

A zinc hexacyanocobaltate catalyst complex is mixed with a 450 molecular weight poly(propylene oxide) triol to form a catalyst slurry containing 1% by weight of the catalyst complex.

Aluminum tri(sec-butoxide) is prepared as a 10% solution in dipropylene glycol n-butyl ether (DPnB).

Into the reactor system described with respect to Comparative Run A are loaded 221 g of the 450 molecular weight triol, 0.124 g of the zinc hexacyanocobaltate catalyst complex and 0.46 g aluminum tri(sec-butoxide). The reactor is heated to 130° C. for 90 minutes with stirring and a nitrogen sparge to dry the reactor contents. The reaction mixture is then heated to 160° C., the reactor is closed, and 273 g of PO is added to initiate the catalyst and alkoxylate the starting triol to a molecular weight of about 1000. As the initial PO feed is completed, the PO feed rate is adjusted to 1.5 grams per minute, a catalyst slurry feed is begun at a rate of 14 microliters per minute, a feed of the aluminum sec-butoxide solution is begun at a rate of 15 microliters per minute, and a glycerin feed (not acidified in this case) is begun at a rate of 0.145 grams per minute. These feed rates correspond to a residence time of 5 hours, with a DMC catalyst concentration of 100 ppm and an aluminum concentration of 70 ppm. Once the reactor reaches its liquid fill point, a product stream is withdrawn. These conditions produce a 1000 molecular weight poly(propylene oxide) homopolymer that contains 91% polymerized propylene oxide and 9% of the residue of the glycerin initiator. Unreacted alkylene oxide concentration in the reactor is 1-2%.

An hour after the catalyst, aluminum sec-butoxide and glycerin feeds are begun, the PO flow rate is adjusted to of 1.17 g/minute, and a feed of 0.33 g/minute of EO is begun. These conditions produce a 1000 molecular weight poly (ethylene oxide/propylene oxide) copolymer containing 20% polymerized EO, 71% polymerized PO and 9% glycerin residues. Unreacted alkylene oxide concentration remains at 1-2%.

After another hour of continuous operation, the PO flow rate is adjusted to 0.838 g per minute and the EO flow rate adjusted to 0.659 g per minute. These conditions are maintained for one hour. Unreacted alkylene oxide concentration remains unchanged. The product produced in this stage is a 1000 molecular weight copolymer of 51% polymerized propylene oxide, 40% polymerized ethylene oxide and 9% glycerin residues.

Then, the alkylene oxide flows are again adjusted to a PO flow rate of 0.57 g per minute and an EO flow rate of 0.907 g per minute. These conditions create a steady state concentration of DMC catalyst of 150 ppm and a residence time of 5 hours, and produce a 1000 molecular weight copolymer containing 36% polymerized propylene oxide, 55% polymerized ethylene oxide and 9% glycerin residues. These reaction conditions are maintained for 23 hours, corresponding to 4.6 residence times. Unreacted alkylene oxide concentration remains steady at 1-2%.

The flow rates are then adjusted once again to a PO addition rate of 0.658 g per minute, an EO addition rate of 1.01 g per minute, a glycerin addition rate of 0.158 g per minute, a DMC catalyst slurry addition rate of 17 microliters per minute and an aluminum sec-butoxide solution addition rate of 14 microliters per minute. These flow rates establish a DMC catalyst concentration of 95 ppm, an aluminum concentration of 70 ppm and a residence time of 4.5 hours. The product is once again a 1000 molecular weight copolymer of 55% polymerized ethylene oxide, 36% polymerized propylene oxide and 9% glycerin residues. The process is maintained at these conditions for 26 hours, corresponding to more than 5.7 residence times, during which time the unreacted oxide content remains at 1 to 1.5%.

At this point, the aluminum sec-butoxide feed is stopped, while otherwise maintaining the conditions (including other flow rates) constant. The aluminum concentration drops to 14 ppm over 9 hours, while the unreacted oxide concentration increases to over 4% due to deactivation of the catalyst. The aluminum sec-butoxide addition is then reinitiated with an injection of 3.5 mL of 10% Aluminum sec-butoxide solution, followed by a continuous addition at a rate of 14 microliters per minute. The unreacted oxide concentration declines immediately and an exothermic temperature rise is seen. Within 45 minutes of the resumption of the aluminum sec-butoxide addition, the unreacted oxide concentration declines again to 1.5% and remains there throughout another 18 hours, or 4 residence times, of continuous operation.

The product has a molecular weight of 1009 and a polydispersity of 1.13. It contains 95 ppm of the DMC catalyst and 60-70 ppm aluminum, as measured by x-ray fluorescence analysis. The product contains 55% polymerized EO by weight.

EXAMPLE 2

A zinc hexacyanocobaltate catalyst complex is mixed with dipropylene glycol mono-n-butyl ether (DPnB) to form a 2% suspension of the catalyst.

Hafnium n-butoxide is separately dissolved in DPnB to form a 10% by weight solution.

A continuous reactor vessel as described in Comparative Run A is charged with:

350 parts of a 1000 molecular weight polyether triol made by polymerizing a mixture of 66% by weight ethylene oxide and 34% by weight 1,2-propylene oxide onto glycerin;

28 parts of a 260 number average molecular weight propoxylated glycerin;

0.0458 parts of the DMC catalyst;

0.015 parts of a 0.15% $H_3PO_4$ solution in water; and 1.45 parts of hafnium n-butoxide.

The reactor contents are heated to 130° C. and dried by purging with nitrogen for 90 minutes while stirring continuously. The reactor is then heated to 160° C., the nitrogen purge is stopped, and the reactor is sealed. A mixture of 34% propylene oxide and 66% ethylene oxide is fed to the reactor slowly. After about 80 g of the alkylene oxide mixture has been fed, catalyst slurry, hafnium n-butoxide solution, and glycerin initiator feeds are begun. Once the reactor reaches its liquid fill point, a product stream is withdrawn. The various flow rates are adjusted to establish a reactor residence time of 8 hours with a steady state catalyst concentration of 100 ppm and a hafnium concentration of 600 ppm. The process is maintained under these conditions for a total of 30 hours. The reactor reaches a steady state concentration of unreacted oxide of 1.5%. The feed rate of catalyst slurry is then reduced to a rate to provide a steady state concentration of 85 ppm of DMC catalyst. The process is operated under these conditions for another 22 hours, during which time reactor reaches a steady state concentration of unreacted oxide of 2.0%. The product has a number average molecular weight of 1000, a polydispersity of 1.24 and contains 85 ppm of the DMC catalyst.

What is claimed is:

1. A continuous process for producing a polyether product by polymerizing an alkylene oxide mixture containing 55 to 75% by weight ethylene oxide and correspondingly 25 to 45% by weight propylene oxide, based on the weight of the alkylene oxide mixture, comprising:
   a) forming in a continuous reactor a mixture of a double metal cyanide catalyst, the alkylene oxide mixture, at least one initiator compound, an aluminum alkoxide or hafnium alkoxide compound not present during the preparation of the double metal cyanide catalyst and a polymerizate consisting of alkoxylated species having molecular weights greater than the initiator compound and up to and including molecular weight of the polyether product, and
   b) continuously adding additional catalyst, additional aluminum alkoxide or hafnium alkoxide compound, additional alkylene oxide mixture and additional initiator compound to the continuous reactor under polymerization conditions and continuously withdrawing a product stream containing the polyether product from the continuous reactor, wherein the aluminum alkoxide or hafnium alkoxide compound is devoid of halide anions.

2. The continuous process of claim 1, wherein steady-state concentrations are maintained during step b).

3. The method of claim 2, wherein the initiator compound has a hydroxyl equivalent weight of 30 to 100.

4. The method of claim 3 wherein the initiator compound is one or more of ethylene glycol, diethylene glycol, triethylene glycol, propylene glycol, dipropylene glycol, tripropylene glycol, glycerin, trimethylolpropane, pentaerythritol, sucrose or sorbitol, or an alkoxylate of any thereof having a hydroxyl equivalent weight of up to 100.

5. The method of claim 3, wherein the polyether product has a hydroxyl equivalent weight of 85 to 5000.

6. The method of claim 4, wherein the build ratio is 2.5 to 65.

7. The process of claim 6, wherein the polyether product has a hydroxyl equivalent weight of 85 to 500 and the build ratio is 2.5 to 15.

8. The method of claim 7, wherein the polyether product has a hydroxyl equivalent weight of up to 400.

9. The method of claim 4, wherein the aluminum alkoxide or hafnium alkoxide compound is present in an amount sufficient to provide at least 0.005 moles of aluminum or hafnium per gram of the double metal cyanide catalyst complex.

10. The method of claim 4, wherein the aluminum alkoxide or hafnium alkoxide compound is present in an amount sufficient to provide up to 0.5 mole of aluminum or hafnium per gram of the double metal cyanide catalyst complex.

* * * * *